United States Patent
Yamashita

(10) Patent No.: US 7,792,910 B2
(45) Date of Patent: Sep. 7, 2010

(54) APPARATUS FOR SENDING IMAGE DATA BY ELECTRONIC MAIL

(75) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1049 days.

(21) Appl. No.: 11/508,942

(22) Filed: Aug. 24, 2006

(65) Prior Publication Data

US 2007/0047011 A1    Mar. 1, 2007

(30) Foreign Application Priority Data

Aug. 31, 2005    (JP) .............................. 2005-252264

(51) Int. Cl.
*G06F 15/16* (2006.01)
(52) U.S. Cl. ...................... 709/206; 709/202
(58) Field of Classification Search ................. 709/202, 709/206
See application file for complete search history.

(56) References Cited

U.S. PATENT DOCUMENTS

| | | | |
|---|---|---|---|
| 5,321,741 A | | 6/1994 | Kaneko et al. |
| 6,640,307 B2 * | | 10/2003 | Viets et al. .................... 726/15 |
| 6,813,036 B1 | | 11/2004 | Matsushita et al. |
| 2002/0048048 A1 | | 4/2002 | Kagawa |
| 2002/0112184 A1 * | | 8/2002 | Hall et al. .................... 713/201 |
| 2002/0143883 A1 | | 10/2002 | Miyake et al. |
| 2003/0131057 A1 * | | 7/2003 | Basson et al. ............... 709/206 |
| 2004/0088364 A1 * | | 5/2004 | Yamadaji ..................... 709/208 |
| 2004/0177273 A1 * | | 9/2004 | Ghaffar ....................... 713/201 |

FOREIGN PATENT DOCUMENTS

| | | |
|---|---|---|
| EP | 0940967 | 9/1999 |
| EP | 1022894 | 7/2000 |
| GB | 2368488 | 5/2002 |
| JP | 10-233860 | 9/1998 |
| JP | 2003044402 | 2/2003 |

* cited by examiner

*Primary Examiner*—David Lazaro
(74) *Attorney, Agent, or Firm*—Rabin & Berdo, P.C.

(57) ABSTRACT

A communication apparatus prepares a message including an image data address. A decision section in the communication apparatus compares the image data address with the destination address of the message and decides whether the recipient will be able to access image data stored at the image data address. If the decision is negative, a notification section notifies the operator of the communication apparatus. The operator can then cancel the message to avoid sending an image data address to a person who cannot access the image data, and take alternative action, such as reducing the size of the image data so that the image data can be included directly in the message.

13 Claims, 8 Drawing Sheets

FIG.3

| SHORTCUT NO. | NAME | MAIL ADDRESS | DOMAIN |
|---|---|---|---|
| 1 | HANAKO | abc@mail.net | mail.net |
| 2 | ICHIRO | def@smtp.com | smtp.com |

THE RECIPIENT IS OUTSIDE THE FIREWALL, AND MAY NOT BE ABLE TO VIEW THE IMAGE.
TO SEND THE IMAGE AS AN ATTACHED FILE, CANCEL THE PROCESS AND SCAN THE IMAGE AGAIN, REDUCING THE RESOLUTION OR THE NUMBER OF COLORS TO REDUCE THE IMAGE DATA SIZE.

TO CONTINUE, PRESS THE START KEY.
TO CANCEL, PRESS THE STOP KEY.

FIG.7

| SHORTCUT NO. | NAME | MAIL ADDRESS | DOMAIN |
|---|---|---|---|
| 012 | HANAKO | abc@mail.net | mail.net |
| 021 | ICHIRO | def@a.mail.net | a.mail.net |

4-1

APPARATUS FOR SENDING IMAGE DATA BY ELECTRONIC MAIL

FIELD OF THE INVENTION

The present invention relates to communication apparatus and a communication system for transmitting image data, more particularly to communication apparatus that sends an image data address and lets the receiving device retrieve the image data from the address.

DESCRIPTION OF THE RELATED ART

Sending photographs and other images by electronic mail has become commonplace, but when the image is large, the image data can overload the recipient's electronic mail software or use up the recipient's allotment of storage space in the electronic mail server system, so that the image can be received only slowly or partially, or in some cases not at all. A known solution to this problem, disclosed in Japanese Patent Application Publication No. 10-233860, has the sender store the image data in a computer system, at a location identified by a universal resource locator (URL), and substitutes the URL for the image data in the electronic mail. The mail recipient then clicks on the URL to retrieve the image directly from the computer system in which it has been stored, using the well-known hypertext transfer protocol (HTTP), for example, without going through the mail server.

When this solution works, it provides a quick and efficient way to send even very large amounts of image data. In recent years, however, many enterprises and other organizations have set up so-called 'firewalls' that restrict the protocols that can be used to transfer data between their internal networks and external networks, and the types of data that can be transferred, to prevent their internal computer systems from being improperly manipulated or accessed from the external network.

A firewall normally accepts arbitrary requests for connection from the internal network to the external network, but denies arbitrary requests for connection from the external network to the internal network. Accordingly, when a person in such an organization stores image data in the organization's computer system and sends the URL of the image by electronic mail to a recipient outside the firewall, the recipient may find that he or she is unable to retrieve the image. This necessitates the sending of further electronic mail between the sender and recipient, sometimes involving a lengthy and frustrating exchange of messages before the sender either finds another way to send the image or abandons the attempt.

In particular, in many recent mail sending devices electronic mail addresses are stored in correspondence to the recipient's name or a shortcut number, for example, and are entered by means of a mouse-click or a few keystrokes, so that the sender does not see the actual address and cannot easily recognize that the destination is outside the firewall. Consequently, an increasing amount of mail is sent through mail servers in vain, as above, conveying image URLs to receiving terminal devices that cannot access to the image data.

SUMMARY OF THE INVENTION

An object of the present invention is to help a person to avoid sending the address of image data to a recipient who cannot access the image data.

The present invention provides a communication apparatus for transmitting a message to a receiving terminal device. The message includes an image data address. A decision section in the communication apparatus compares the image data address with the address of the receiving terminal device to decide whether the receiving terminal device will be able to acquire image data from the image data address. If the decision section decides that the receiving terminal device cannot acquire the image data, a notification section provides suitable notification to the user of the communication apparatus.

The user can then take appropriate action, such as compressing the image data to a size such that the image data can be included directly in the transmitted message. In any case, the user can avoid the frustration of sending the recipient a message with the address of image data that the recipient cannot access because, for example, the image data are protected by a firewall.

BRIEF DESCRIPTION OF THE DRAWINGS

FIG. 3 illustrates a domain table stored in the domain memory in FIG. 2;

FIG. 5 shows an example of a notification text in the first embodiment;

FIG. 7 illustrates a domain table stored in the domain memory in FIG. 6.

DETAILED DESCRIPTION OF THE INVENTION

Figure 1:
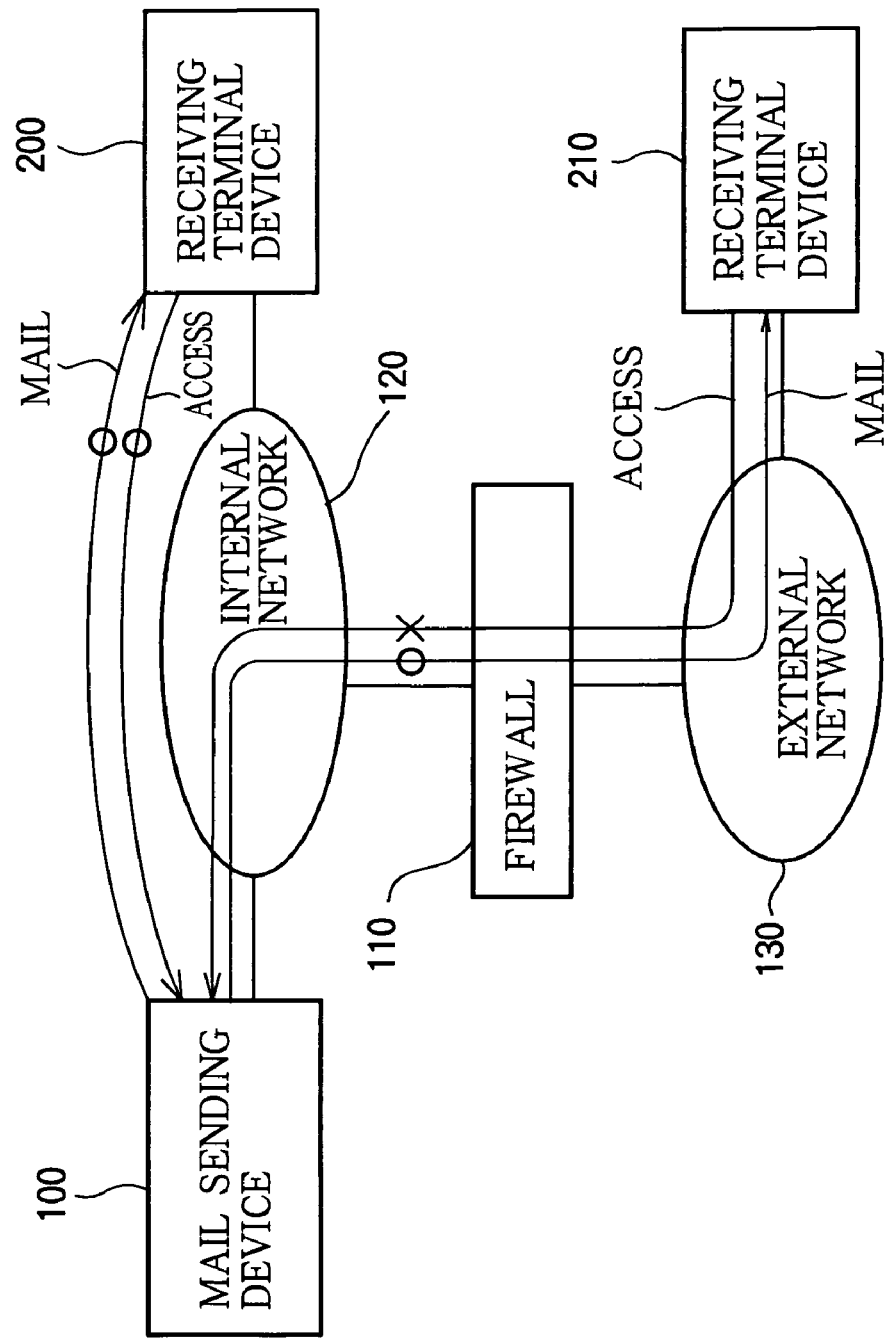
FIG. 1 is a network configuration diagram of a communication system with a firewall.

Embodiments of the invention will now be described with reference to the attached drawings, in which like elements are indicated by like reference characters.

First Embodiment

Referring to FIG. 1, the first embodiment operates in a communication system in which a mail sending device 100 is located behind a firewall 110 that interconnects an internal network 120 and an external network 130. The mail sending device 100 communicates with a receiving terminal device 200, also located behind the firewall 110, directly through the internal network 120, and with another receiving terminal device 210, located outside the firewall 110, through the internal network 120, the firewall 110, and the external network 130. The two receiving terminal devices 200, 210 are exemplary of a plurality of receiving terminal devices connected to the internal network 120 and external network 130.

The mail sending device 100 is a communication apparatus capable of transmitting electronic mail by the well-known simple mail transfer protocol (SMTP) to a mail server (not shown) that routes the mail to its destination. One type of electronic mail message includes an address at which image data are stored in the mail sending device 100 itself, or elsewhere behind the firewall 110. The address is a universal resource locator of the type defined in Requests for Comments (RCF) 1738 'Uniform Resource Locator (URL)' and 2616 'Hypertext Transfer Protocol' of the Internet Engineering Task Force (IETF). If this type of message is received at receiving terminal device 200, the operator of receiving terminal device 200 can view the image by transferring the image data directly from the indicated address, using the hypertext transfer protocol (HTTP), without having the image data pass through the mail server.

The mail sending device 100 and receiving terminal device 200 are, for example, personal computers (PCs) residing in offices on the same floor of a building. Receiving terminal device 210 is a PC located elsewhere, at a different company from mail sending device 100 and receiving terminal device 200, for example, and is separated from the mail sending device 100, internal network 120, and receiving terminal device 200 by the firewall 110. All three PCs have software and hardware for executing SMTP and HTTP procedures.

The internal network 120 may be a local area network (LAN), and may include any type of communication links and protocol converters that enable the mail sending device 100 and receiving terminal device 200 to be connected by the well-known transfer control protocol/Internet protocol (TCP/IP).

The external network 130 may be a wide-area network including public telephone lines and the like. As long as the receiving terminal device 200 can be connected through the network by use of TCP/IP, the connection may pass through any lines and protocol converters en route.

The firewall 110 is a type of interface interposed between the internal network 120 and external network 130 to restrict the types of data that can pass between them and the protocols that can be used to transfer the data, in order to prevent the mail sending device 100, receiving terminal device 200, and other devices connected to the internal network 120 from being improperly manipulated or accessed from the external network 130.

Figure 2:
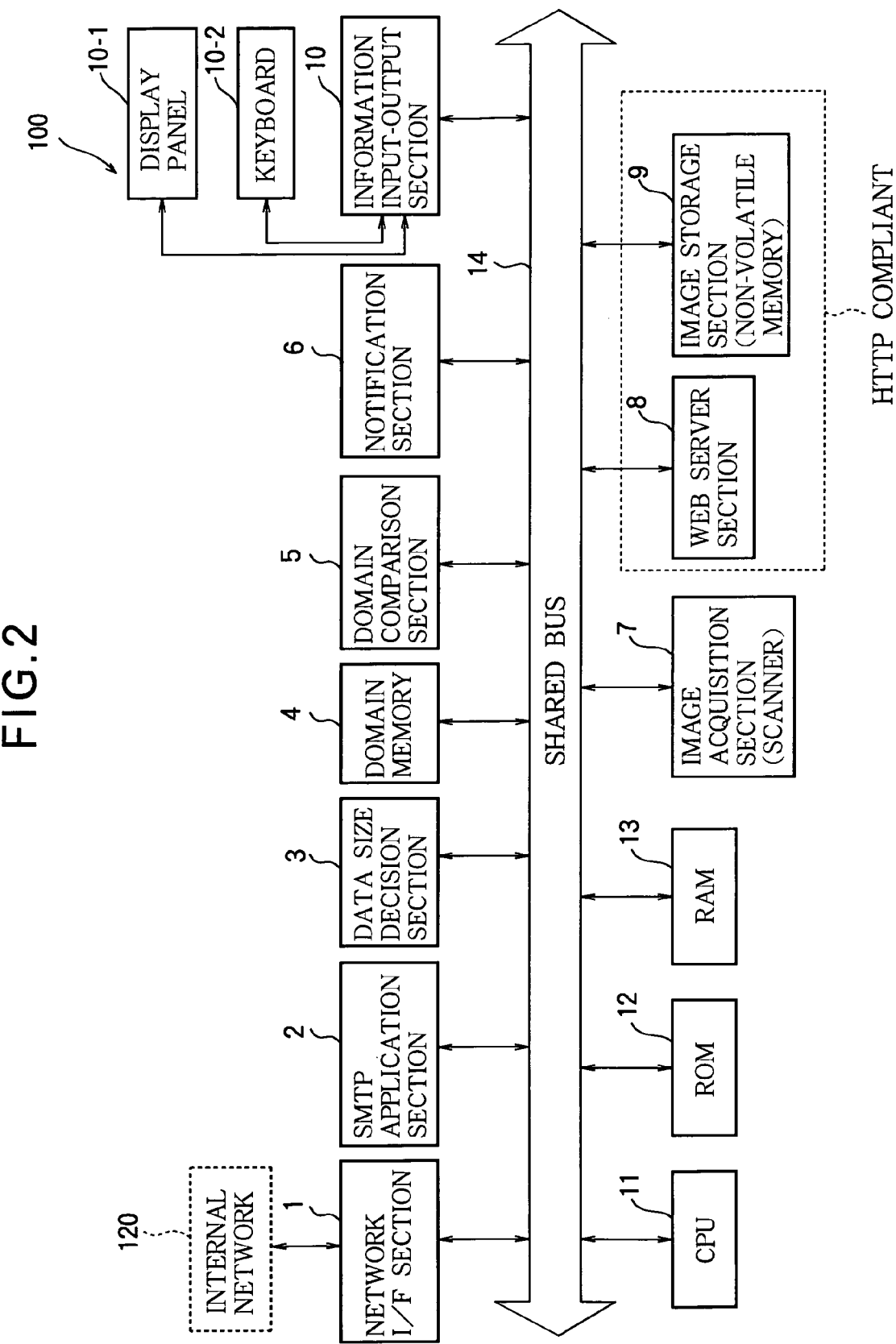
FIG. 2 is a block diagram of the mail sending device in a first embodiment of the invention.

Referring to FIG. 2, the mail sending device 100 comprises a network interface section 1, an SMTP application section 2, a data size decision section 3, a domain memory 4, a domain comparison section 5, a notification section 6, an image acquisition section 7, a Web server section 8, an image storage section 9, an information input-output section 10, a display panel 10-1, a keyboard 10-2, a central processing unit (CPU) 11, a read-only memory (ROM) 12, a random-access memory (RAM) 13, and a shared bus 14.

The network interface section 1 is a communication interface section interconnecting the mail sending device 100 and internal network 120.

The SMTP application section 2, operating at the direction of the operator of the mail sending device 100, creates electronic mail messages that are capable of being sent to the mail server (not shown) by SMTP. An electronic mail message may include image data or an image data address. Image data may be included directly in the body of the mail message, or as a file attached to the mail message. The SMTP application section 2 also has other functions, which will not be described to avoid obscuring the invention with irrelevant detail. The SMTP application section 2 is activated when the CPU 11 executes a prescribed control program stored in the ROM 12.

The data size decision section 3 determines the size S of an image data file stored in, for example, the RAM 13, compares the size with a predetermined threshold value T, and thereby decides whether the amount of data is small enough for inclusion in electronic mail. This section 3 is activated when the CPU 11 executes another control program stored in the ROM 12.

The domain memory 4 is a nonvolatile memory that stores a table of destinations to which electronic mail can be sent by specifying the recipient's name or a shortcut number. Two entries in this domain table 4-1 are illustrated in FIG. 3. Each entry also includes the recipient's electronic mail address and the domain name.

The domain comparison section 5 uses the domain table 4-1 to find the domain to which electronic mail created by the SMTP application section 2 is addressed, compares this domain with the domain of the mail sending device 100, and thereby decides whether the destination address is located within the same protected area. Typically, the firewall 110 is configured to protect a single domain comprising the internal network 120 and its connected devices. In this case, any receiving terminal device connected to the internal network 120 will have the same domain name as the mail sending device 100 and will be able to access image data stored in the mail sending device 100 or any other computing device connected to the internal network. Other receiving terminal devices, such as receiving terminal device 210, will be able to access such image data only if a specific setting has been made in the firewall 110.

The image data address is typically a URL including the domain name of the mail sending device 100 followed by index information. By comparing the domain names of the receiving terminal device and the mail sending device, accordingly, the domain comparison section 5 in effect is comparing the address of the receiving terminal with the image data address to see if they are sufficiently similar, where in this embodiment 'sufficiently similar' means that they have the same domain name.

When the domain comparison section 5 decides that an electronic mail message is destined to a domain outside the protected area (connected to the external network 130), if the message is known to include an image data address that points inside the protected area, the notification section 6 displays a predetermined warning message on a display panel 10-1 to warn the operator that the recipient of the message may not be able to view the image, and suggest alternative action that the operator might take. The notification section 6 is activated when the CPU 11 executes still another control program stored in the ROM 12.

The image acquisition section 7 is a means of capturing image data by, for example, scanning a printed document. The captured image data are temporarily stored as a file in a predetermined location in the RAM 13.

The Web server section 8 processes requests for image data stored in the image storage section 9, and sends the requested image data to the requesting device, e.g., to receiving terminal device 200. The Web server section 8 is an application that is activated when the CPU 11 executes yet another control program stored in the ROM 12.

The image storage section 9 is a nonvolatile memory that stores the image data acquired by the image acquisition section 7, after the image data have been temporarily stored in the RAM 13.

The Web server section 8 operates in compliance with the hypertext transfer protocol. Accordingly, image data stored in the image storage section 9 are given a universal resource locator (URL), and when sent to a requesting device, the image data are sent by the hypertext transfer protocol.

The information input-output section 10 controls the display panel 10-1 and keyboard 10-2 to provide a man-machine interface between the operator and mail sending device 100. The information input-output section 10 operates when, for example, the notification section 6 displays a notification on the display panel 10-1, or when the operator enters a shortcut number on the keyboard 10-2.

The CPU 11 is a microprocessor that controls the mail sending device 100 by executing programs stored in the ROM 12.

The ROM 12 is a read-only memory that stores the control programs executed by the CPU 11, and control data used by these programs. In particular, in this embodiment, the ROM 12 that stores the programs executed by the CPU 11 to activate the SMTP application section 2, data size decision section 3, domain comparison section 5, notification section 6, and Web server section 8.

The RAM 13 is a random access memory that provides a work area necessary when the CPU 11 executes a control program. In this embodiment, one function of the RAM 13 is to store image data acquired by the image acquisition section 7 while the data size decision section 3 determines the quantity of data.

The shared bus 14 is a communication bus through which the components and sections described above are interconnected.

Figure 4:
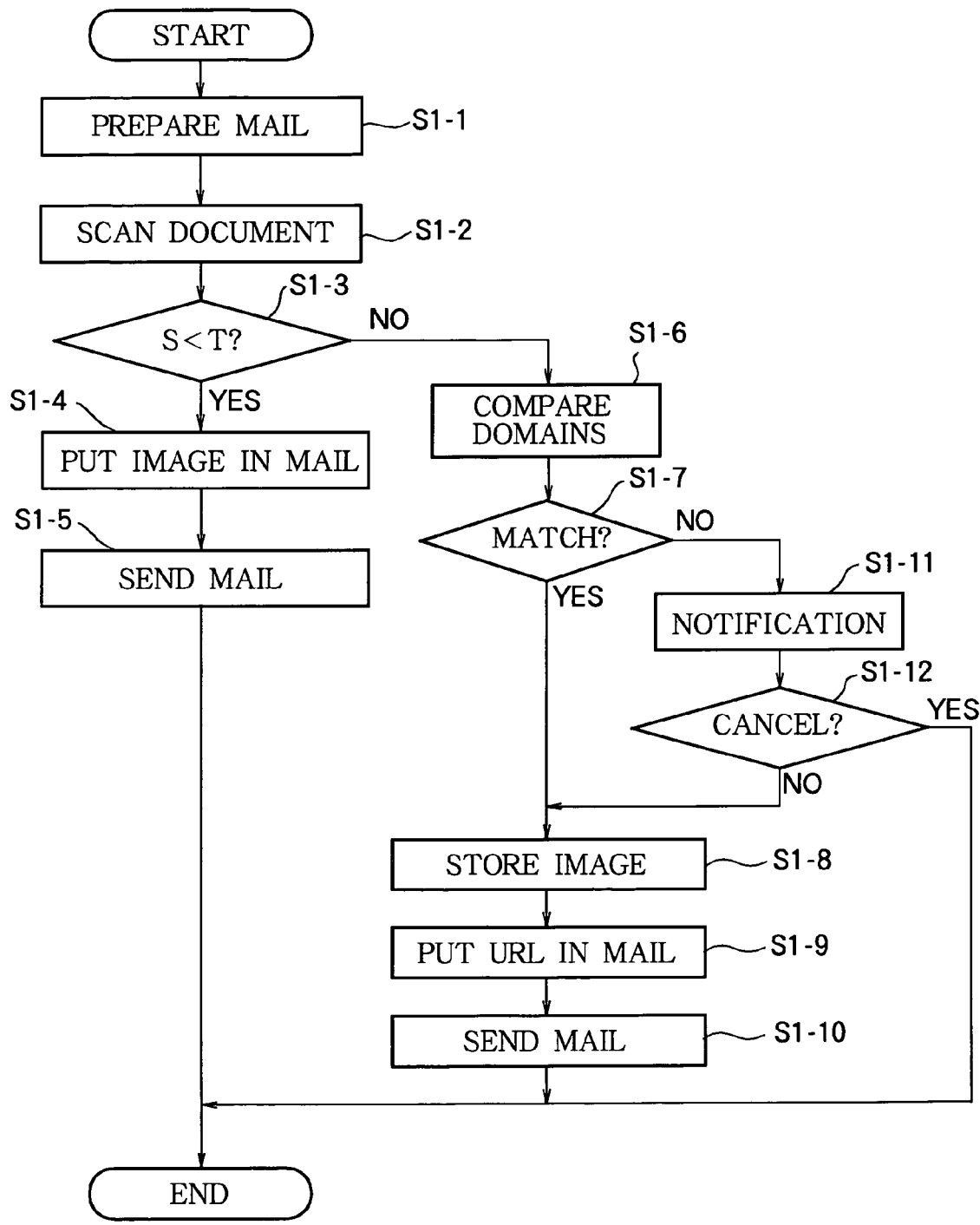
FIG. 4 is a flowchart illustrating the operation of the first embodiment.

Next, the operation of the first embodiment will be described with reference to the flowchart in FIG. 4.

In step S1-1, the operator uses the SMTP application section 2 (FIG. 2) to prepare for mail transmission. It will be assumed below that the operator designates the destination address by entering a shortcut number from the keyboard 10-2, and also requests the inclusion of a scanned image.

In step S1-2, the image acquisition section 7 scans a document supplied by the operator, and stores the acquired image data in the RAM 13.

In step S1-3, the data size decision section 3 measures the size S (e.g., number of bytes) of the image data acquired by the image acquisition section 7. The operation proceeds to step S1-4 if the size S is less than the predetermined threshold value T, and to step S1-6 otherwise.

In step S1-4, since there is less image data than the predetermined threshold amount, the SMTP application section 2 creates an electronic mail message including the image data, as well as a text message entered by the operator on the keyboard 10-2, the destination address designated in step S1-1, and other information required by SMTP.

In step S1-5, the network interface section 1 sends the electronic mail message to a designated mail server. This completes the mail sending operation.

In step S1-6, since the quantity S of image data equals or exceeds the threshold value T, the domain comparison section 5 reads the domain of the destination address from the domain memory 4, and compares it with its own domain (the domain of the mail sending device 100).

In step S1-7, the result of the comparison is acted on by proceeding to step S1-8 if the domain name in the address specified by the operator in step S1-1 matches the domain name of the mail sending device, and otherwise to step S1-11.

In step S1-8, since the decision of the domain comparison section 5 is that the two domains match, the image data acquired by the image acquisition section 7 and stored in the RAM 13 are copied into the image storage section 9, and the address (URL) at which the image data are stored in the image storage section 9 is passed to the SMTP application section 2.

In step S1-9, the SMTP application section 2 creates an electronic mail message including the URL of the image data, the destination address, message text entered by the operator, and the other necessary information.

In step S1-10, the network interface section 1 sends the electronic mail, including the URL, to the address specified by the operator in step S1-1. This completes the mail sending operation.

In step S1-11, when the decision of the domain comparison section 5 in step S1-7 is that the two domains do not match, the notification section 6 displays a message on the display panel 10-1 as shown in FIG. 5, warning the operator that the mail recipient may not be able to access the image data ('The recipient is outside the firewall, and may not be able to view the image'), suggesting an alternative way to sent the image ('To send the image as an attached file, cancel the process and scan the image again, reducing the resolution or number of colors to reduce the data size'), and asking the operator to indicate what to do ('To continue, press the START key. To cancel, press the STOP key.').

In step S1-12, if the operator elects to cancel, the operation is terminated. If the operator elects to continue, the operation proceeds to step S1-8, and then through steps S1-9 and S1-10 to termination.

Normally, the operator will choose to continue if the intended recipient is known to have specific privileges, granted by a special firewall setting, to access the image data, and will otherwise choose to cancel.

As described above, according to this embodiment, besides substituting an URL for large image data in outgoing electronic mail, the mail sending device notifies the operator if the terminal device that will receive the mail with the mail data URL is not located within the same firewall protection area as the mail sending device, and tells the operator how to reduce the amount of image data so that the image data can be included in the mail message itself. As a result, transmission of mail with inaccessible URLs is eliminated, frustration at both the sending and receiving ends is avoided, and images are sent and received reliably without lengthy mail exchanges.

In a variation of the first embodiment, the image data are stored not in the operator's PC (the mail sending device 100) but in another computer protected by the firewall 110. In this case the domain comparison section 5 compares the domain name of the computer in which the image data are stored with the domain name of the receiving terminal device. The Web server section 8 and image storage section 9 form part of the computer in which the image data are stored and need not be included in the mail sending device 100.

In another variation, the display unit 10-1 is equipped with loudspeakers or other audio output means, and the notification section 6 produces an audible notification in addition to or instead of the visual notification on the display panel 10-1.

In yet another variation, the mail sending device is also equipped with a printer, and the notification section 6 produces a printed notification in addition to or instead of the visual notification on the display panel 10-1.

In still another variation, the image acquisition section 7 is a digital camera. The mail sending terminal in this case may be a personal computer connectable to the digital camera, or a portable device such as a mobile telephone in which the digital camera is a built-in component. Alternatively, the image acquisition section 7 may be a communication device that obtains image data from the internal or external communication network, or a software section that creates image data, or reads image data from an external storage device (not shown).

Second Embodiment

The second embodiment addresses the situation in which a plurality of domains with similar but non-identical domain names are defined within the same firewall-protected area, a practice that is becoming increasingly common in large organizations. The second embodiment uses a backward match decision table to identify domains to which mail with image data URLs can be sent.

Figure 6:
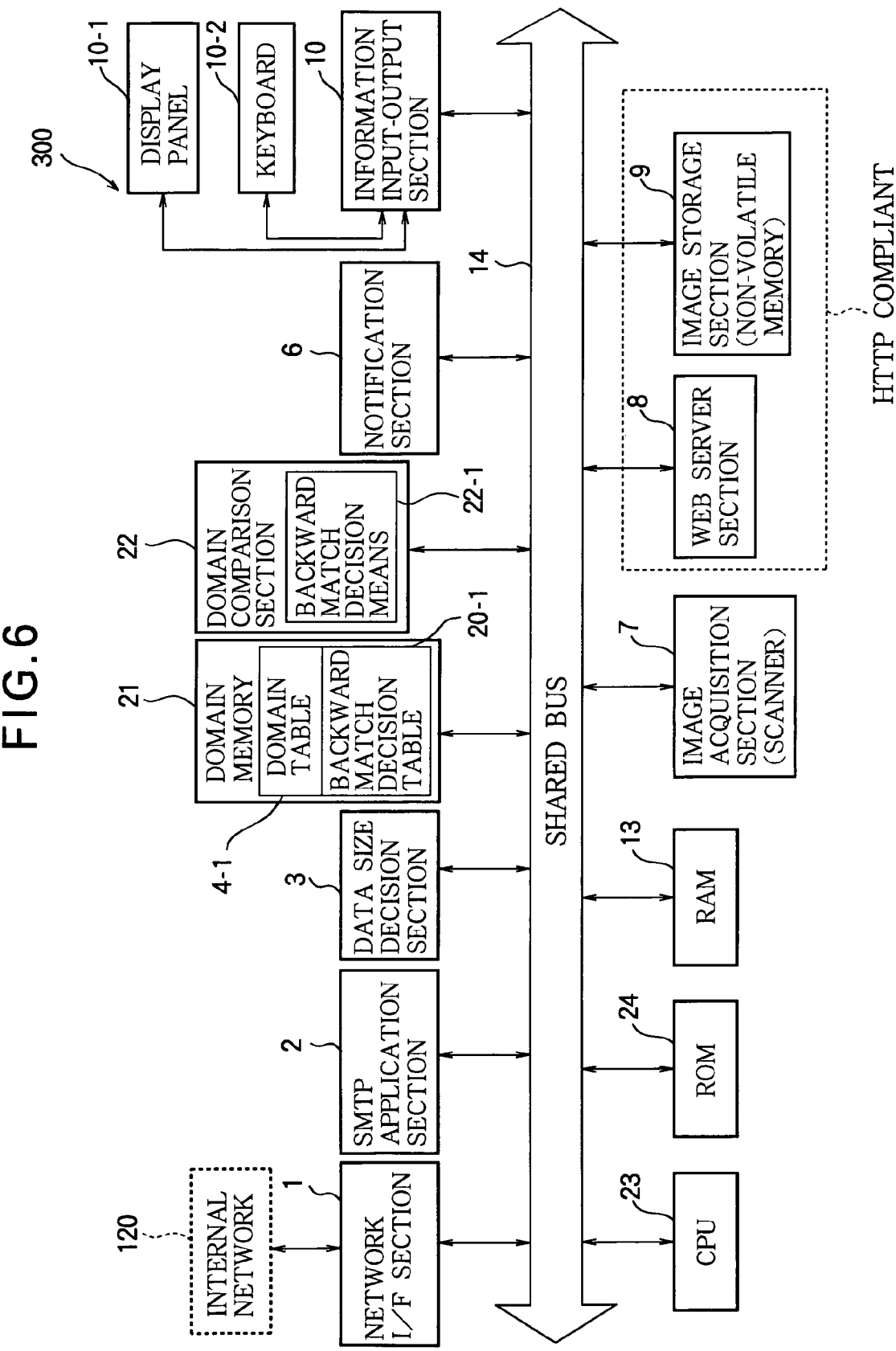
FIG. 6 is a block diagram of the mail sending device in a second embodiment.

Referring to the block diagram in FIG. 6, the mail sending device 300 in the second embodiment comprises a network interface section 1, an SMTP application section 2, a data size decision section 3, a notification section 6, an image acquisition section 7, a Web server section 8, an image storage section 9, an information input-output section 10, a RAM 13, and a shared bus 14 as described in the first embodiment, and a domain memory 21, a domain comparison section 22, a CPU 23, and a ROM 24 that differ from the first embodiment. The CPU 23 and ROM 24 differ from the first embodiment only in that they store and execute different program code for the domain comparison section 22. The following description will focus on the domain memory 21 and domain comparison section 22.

The domain memory 21 is a nonvolatile memory that stores a domain table 4-1 and a backward match decision table 20-1. The domain table 4-1, illustrated in FIG. 7, includes the information described in the first embodiment. The two entries shown in FIG. 7 belong to individuals in, for example, different departments in the same company, and have similar but non-identical domain names. Both domains are disposed within the same firewall-protected area. The backward match decision table 20-1 lists, for example, one or more terminal character strings; any domain name ending in one of the listed character strings is considered to belong to a domain in the firewall-protected area. If 'mail.net' is listed in the backward match decision table 20-1, then both of the domains names given in FIG. 7 are considered to lie in the firewall-protected area. As another example, if 'abc.com' is listed in the backward match decision table 20-1, then the addresses aaa@12.abc.com, bbb@0.5.abc.com, and ccc@10.abc.com are all considered to be located within the firewall-protected area.

It should be noted that the character strings stored in the backward match decision table 20-1 must be long enough to characterize the firewall protection area. Common terminal strings such as '.net' and '.com' are inadequate.

The domain comparison section 22 includes a backward match decision means 22-1. When the operator enters a shortcut number or a mail recipient's name from the keyboard 10-2, the domain comparison section 22 is activated (the CPU 23 executes a predetermined control program prestored in the ROM 24). The domain comparison section 22 searches the domain table 4-1 in the domain memory 21 to find the destination address and domain. If the destination domain name matches the computer in which the image data are stored (e.g., the domain name of the mail sending device 100), then the domain comparison section 22 decides that the receiving terminal device is located within the same firewall protection area as the mail sending device itself, and can accordingly access the image data. Otherwise, the backward match decision means 22-1 compares the destination domain name with the character string or strings listed in the backward match decision table 20-1, and decides that the receiving terminal device can access the image data if the destination domain name terminates in any of the character strings listed in the backward match decision table 20-1.

Figure 8:
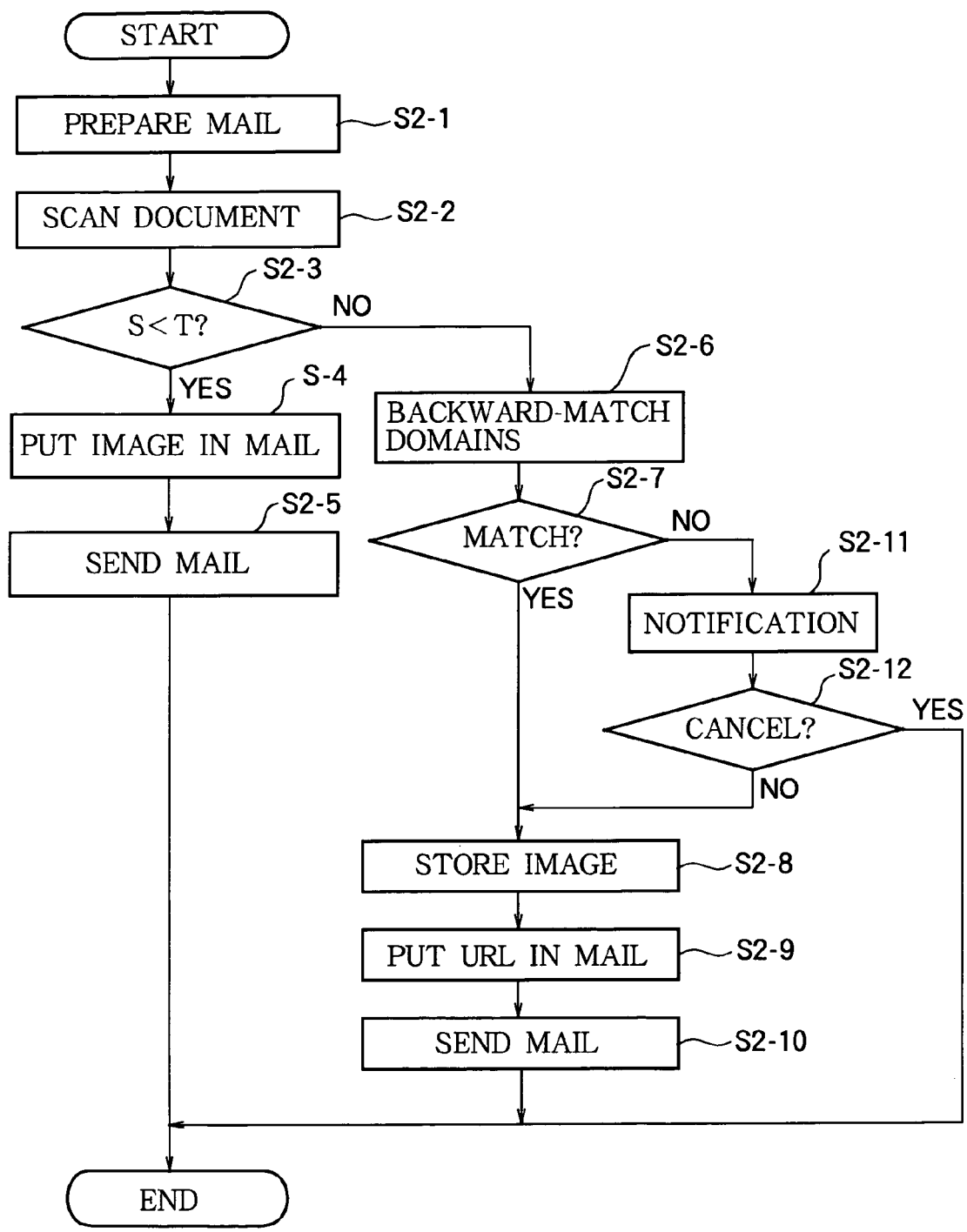
FIG. 8 is a flowchart illustrating the operation of the second embodiment.

Next, the operation of the second embodiment will be described with reference to the flowchart in FIG. 8.

In step S2-1, the operator uses the SMTP application section 2 (FIG. 6) to prepare to send a scanned image by electronic mail, entering the destination address as a shortcut number from the keyboard 10-2 as described in the first embodiment.

In step S2-2, the image acquisition section 7 scans a document set by the operator and stores the image data in the RAM 13.

In step S2-3, the data size decision section 3 measures the size S of the image data acquired by the image acquisition section 7 and proceeds to step S2-4 if the size S is less than a predetermined threshold value T, or to step S2-6 if otherwise.

In step S2-4, the SMTP application section 2 creates an electronic mail message including the image data, message text, the destination address, and other necessary information.

In step S2-5, the network interface section 1 completes the mail sending operation by sending the electronic mail message to a designated mail server.

In step S2-6, the domain comparison section 22 reads the domain of the destination address from the domain memory 4 and compares it with the domain of the mail sending device 100. If the two domains do not match, the destination domain is further compared with the data in the backward match decision table 20-1.

In step S2-7, the result of the comparison is acted on to proceed to step S2-8 if the domain of the address specified by the operator in step S2-1 matches the domain of the mail sending device or if a backward match is obtained, and otherwise to step S2-11.

In step S2-8, the image data acquired by the image acquisition section 7 is stored in the image storage section 9 and given an address (URL), which is passed to the SMTP application section 2.

In step S2-9, the SMTP application section 2 creates an electronic mail message including the URL of the image data, message text, the destination address, and the other necessary information.

In step S2-10, the network interface section 1 completes the mail sending operation by sending the electronic mail with the added URL to the designated mail server.

In step S2-11, the notification section 6 displays a message such as the one shown in FIG. 5 on the display panel 10-1, explaining that the destination address is outside the firewall protection area and asking the operator to select whether to continue or cancel the mail sending operation.

In step S2-12, if the operator elects to cancel, the operation is terminated. If the operator elects to continue, the operation proceeds to step S2-8, and then through steps S2-9 and S2-10 to termination.

The second embodiment provides the same effects as the first embodiment, but extends these effects to an organization that establishes multiple domains with similar domain names in the same firewall-protected area.

In a variation of the second embodiment, the backward match decision table is replaced by a table listing the complete names of all domains in the same protected area as the mail sending device 100, and this table is updated whenever a new domain is added to the protected area.

In another variation of the second embodiment, instead of backward matching, another procedure is used to decide whether the destination address is sufficiently similar to the address at which the image data are stored, and notification is issued if they are not sufficiently similar.

The invention is not limited to the embodiments and variations described above. Those skilled in the art will recognize that further variations are possible within the scope of the invention, which is defined by the appended claims.

What is claimed is:

1. A communication apparatus for transmitting a message to a receiving terminal device, the message including an image data address indicating a location where image data are stored, the communication apparatus including a memory and a processor for executing instructions stored in the memory, the memory comprising:

a decision section including instructions for comparing the image data address with an address of the receiving terminal device and thereby deciding the receiving terminal device can acquire image data from the image data address if the address of the receiving terminal device is sufficiently similar to the image data address, the decision section comparing domain names included in the image data address and the address of the receiving terminal; and a notification section including instructions for notifying an operator of the communication apparatus when the decision section decides that the receiving terminal device cannot acquire the image data.

2. The communication apparatus of claim 1, wherein the decision section determines sufficient similarity by a backward matching procedure.

3. The communication apparatus of claim 1, wherein the message is an electronic mail message.

4. The communication apparatus of claim 1, wherein the communication apparatus is connected to the receiving terminal device through a firewall.

5. The communication apparatus of claim 1, wherein the communication apparatus stores the image data in said location if the image data have at least a predetermined size, and sends the image data as part of the message if the image data have less than the predetermined size.

6. The communication apparatus of claim 1, further comprising a display unit, wherein the notification section notifies the operator by displaying a notification on the display unit.

7. The communication apparatus of claim 1, further comprising audio output means, wherein the notification section notifies the operator by giving an audible notification through the audio output means.

8. The communication apparatus of claim 1, further comprising a printing unit, wherein the notification section notifies the operator by giving a printed notification through the printing unit.

9. The communication apparatus of claim 1, wherein the image data address comprises a universal resource locator.

10. The communication apparatus of claim 9, wherein the universal resource locator complies with Request for Comments 1738 of the Internet Engineering Task Force.

11. The communication apparatus of claim 10, wherein the universal resource locator further complies with Request for Comments 2616 of the Internet Engineering Task Force.

12. A communication system including the communication apparatus of claim 1 in which, when the decision section decides that the receiving terminal device can access the image data, the communication apparatus sends the message as electronic mail to the receiving terminal device.

13. The communication system of claim 12, wherein the receiving terminal device, after receiving the electronic mail, retrieves the image data from the image data address by use of a hypertext transfer protocol.

* * * * *